US011977966B2

(12) United States Patent
Malladi et al.

(10) Patent No.: US 11,977,966 B2
(45) Date of Patent: May 7, 2024

(54) METHOD AND SYSTEM FOR MINIMIZING PASSENGER MISCONNECTS IN AIRLINE OPERATIONS THROUGH LEARNING

(71) Applicant: Tata Consultancy Services Limited, Mumbai (IN)

(72) Inventors: Tejasvi Malladi, Chennai (IN); Karpagam Murugappan, Chennai (IN); Depak Sudarsanam, Chennai (IN); Ramasubramanian Suriyanarayanan, Chennai (IN); Arunchandar Vasan, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 757 days.

(21) Appl. No.: 17/136,702

(22) Filed: Dec. 29, 2020

(65) Prior Publication Data
US 2021/0350278 A1    Nov. 11, 2021

(30) Foreign Application Priority Data

May 6, 2020  (IN)  .............................. 202021019331

(51) Int. Cl.
*G06Q 30/00*      (2023.01)
*G06F 18/214*     (2023.01)
(Continued)

(52) U.S. Cl.
CPC ......... *G06N 3/006* (2013.01); *G06F 18/2155* (2023.01); *G06N 20/00* (2019.01); *G06Q 10/02* (2013.01); *G06Q 10/04* (2013.01)

(58) Field of Classification Search
CPC ......... G06N 20/00; G06Q 10/02; G06Q 10/04
See application file for complete search history.

(56) References Cited

U.S. PATENT DOCUMENTS

| 9,984,580 B2 * | 5/2018 | Liao ..................... G08G 5/0043 |
| 2005/0165628 A1 * | 7/2005 | Vaaben ................. G06Q 10/06 |
| | | 705/13 |

(Continued)

FOREIGN PATENT DOCUMENTS

| CN | 111144631 A * | 5/2020 | ........... G06K 9/6256 |
| EP | 3093806 A1 * | 11/2016 | |

OTHER PUBLICATIONS

Forecasting Airport Transfer Passenger Flow Using Real-Time Data and Machine Learning, Working Paper 19-040, 2018, < https://www.hbs.edu/ris/Publication%20Files/19-040_89360426-c7a9-4aac-95e1-a3a3db276dc8.pdf (Year: 2018).*

(Continued)

*Primary Examiner* — Sun M Li
(74) *Attorney, Agent, or Firm* — FINNEGAN, HENDERSON, FARABOW, GARRETT & DUNNER, LLP

(57) ABSTRACT

Considering the dependency of a flight hold time on multitude of dynamically varying factors, determining an optimal hold time balancing between passenger utility and airline utility is challenging. State of art approaches are limited to use of only deterministic approaches with limited ML assistance that require huge labelled training data. Embodiments disclosed herein provide a method and system for computing and recommending optimal hold time for every flight of an airline so as to minimize passenger misconnects in airline operations through Reinforcement Learning (RL). The method disclosed utilizes RL, which is trained to make decision at a flight level considering local factors while still adhering to the global objective based on global factors. Further method introduces business constants in the rewards to the RL agents bringing in airline specific flexibility in reward function.

13 Claims, 14 Drawing Sheets

(51) Int. Cl.
  *G06N 3/006* (2023.01)
  *G06N 20/00* (2019.01)
  *G06Q 10/02* (2012.01)
  *G06Q 10/04* (2023.01)

(56) References Cited

U.S. PATENT DOCUMENTS

| | | | |
|---|---|---|---|
| 2010/0184526 | A1 | 7/2010 | Park |
| 2018/0158154 | A1* | 6/2018 | Arguello ............... G06Q 50/14 |
| 2019/0057327 | A1* | 2/2019 | Arguello ............... G06N 7/01 |
| 2019/0080615 | A1* | 3/2019 | Small ................... G08G 5/003 |
| 2019/0220827 | A1* | 7/2019 | Cogill ............... G06Q 10/06316 |
| 2020/0043351 | A1* | 2/2020 | Hunter ................ G08G 5/0013 |
| 2020/0050997 | A1* | 2/2020 | Fox ....................... G06F 18/214 |
| 2021/0027635 | A1* | 1/2021 | Lopez ................... G06N 20/00 |

OTHER PUBLICATIONS

S. Hafizogullari, P. Chinnusamy and C. Tunasar, "Simulation reduces airline misconnections: a case study," Proceedings of the Winter Simulation Conference, San Diego, CA, USA, 2002, pp. 1192-1198 vol. 2, doi: 10.1109/WSC.2002.1166377. (Year: 2002).*

Zhang, Y. (2008). Real-time Inter-modal Strategies for Airline Schedule Perturbation Recovery and Airport Congestion Mitigation under Collaborative Decision Making (CDM). UC Berkeley: University of California Transportation Center. Retrieved from https://escholarship.org/uc/item/2k44c9tx (Year: 2008).*

Forecasting Airport Transfer Passenger Flow Using Real-Time Data and Machine Learning, Working Paper 19-040, 2018, < https://www.hbs.edu/ris/Publication%20Files/19-040_89360426-c7a9-4aac-95e1-a3a3db276dc8.pdf (Year: 2018) (Year: 2018).*

S. Hafizogullari, P. Chinnusamy and C. Tunasar, "Simulation reduces airline misconnections: a case study," Proceedings of the Winter Simulation Conference, San Diego, CA, USA, 2002, pp. 1192-1198 vol. 2, doi: 10.1109/WSC.2002.1166377. (Year: 2002) ( Year: 2002).*

M. Schultz and S. Reitmann, "Prediction of Aircraft Boarding Time Using Lstm Network," 2018 Winter Simulation Conference (WSC), Gothenburg, Sweden, 2018, pp. 2330-2341, doi: 10.1109/WSC.2018.8632532. (Year: 2018).*

Author: Gabriel Hondet Title: Airline Disruption Management with Aircraft Swapping and Reinforcement Learning Title of the item: Computer Science Date: 2018 Publisher: Research Gate Link: https://www.researchgate.net/publication/327755601_Airline_disruption_problem_management_via_reinforcement_learning/link/5c175cff92851c39ebf3013a/download.

Author: Poornima Balakrishna, Rajesh Ganesan, Lance Sherry Title: Estimating taxi out times with a reinforcement learning algorithm Title of the item: Digital Avionics Systems Conference Date: 2008 Publisher: IEEE Link: https://www.researchgate.net/publication/224357973_Estimating_Taxi-out_times_with_a_reinforcement_learning_algorithm/link/5d2e288192851cf4408a6e51/download.

* cited by examiner

METHOD AND SYSTEM FOR MINIMIZING PASSENGER MISCONNECTS IN AIRLINE OPERATIONS THROUGH LEARNING

PRIORITY CLAIM

This U.S. patent application claims priority under 35 U.S.C. § 119 to the Indian patent application no. 202021019331, filed on May 6, 2020. The entire contents of the aforementioned application are incorporated herein by reference.

TECHNICAL FIELD

The embodiments herein generally relates to automation in management of airline operations and, more particularly, to a method and system for minimizing passenger misconnects in airline operations through learning.

BACKGROUND

Technological development has contributed largely towards bringing in automation in majority of tasks or actions, which traditionally required manual effort. Intelligent or smart automation is expected to have none or minimal manual intervention to achieve an objective or perform the task and also expected to consider maximum factors affecting the task or objective. Moreover, it is expected that a smart automation captures dynamic nature of the dependent factors, practical challenges or real time constraints of the surrounding environment to achieve the objective with minimal error.

One of the critical problems in the airline industry, where complete automation is expected to reduce manual effort and enhance user experience, is managing passenger flight misconnects. As can be understood managing passenger flight misconnects has multiple dependencies, most of which are unpredictable or are dynamic. A passenger can miss a connecting flight due to several reasons, but the most common case is due to a delayed incoming flight. In such a scenario the passenger is merely a helpless victim who may have to accept the next best option provided by the airline. Public display of passenger unhappiness on social media can affect the airline's brand image. Airlines have traditionally tried to run an efficient network where they try to maintain on time departures but if several connecting passengers are going to miss the connection they may have to compromise. This compromise must make sense both in terms of passenger care and operation efficiency. The decision to make such holds have traditionally been made by a human expert with a limited view of the cause and impact. Given this state, most decisions may seem optimal (as the best decision for accommodating all missing passengers) but may end up doing worse than good globally for the entire network.

Thus, while determining the optimal hold time for any flight, local factors and global factors and business goals of the airline are critical. Addressing the problem identifying the optimal hold time for a flight to minimize passenger misconnections is challenging as it involves multiple factors that need to be rightly balanced. Flights can be delayed due to various reasons outside the control of the airline, thus resulting in a delayed departure/arrival. If some passengers on one such flight were to have a tight connection to a next flight, there is a high chance they may miss the connection and so the airline may have to rebook them. This is an undesirable state for both the airline and the passenger. While the passenger mostly has a time-based disutility (delay to destination), the airline has more in terms of utility and both money and brand value/loyalty are at stake. Given the hub and spoke model of most airlines, this problem is compounded at the hub due to multiple incoming connections with varying degrees of delays. To further compound the problem there are several other factors to consider before deciding to hold a flight like crew legality, curfew rules, penalties, ground staff availability, etc.

Conventionally approaches include a human centric approach and an automation using (operating time) buffer-based rules. However, as can be understood the rule based automation does not provide intelligent automation, as fixed rules hardly can capture the high dynamic variation in the above discussed dependent factors, which play important part in deciding an optimal hold time of a flight that best serves the passenger and the airline.

Deterministic or Machine learning (ML) based approaches are steps towards intelligent automation in managing the hold time to minimize passenger misconnects. However, ML has its own limitations as this requires huge volume of labelled data for offline training before it can be implemented in real world operations. Moreover, given the ever-changing and chaotic nature of airline operations, it is likely that any deterministic approach may have challenges to keep pace with the dynamically varying requirements in airline operations.

Reinforcement Learning (RL) is an area of machine learning where RL agents ought to take actions in an environment in order to maximize the notion of cumulative reward. Unlike ML based approaches, RL does not require labelled training data and hence can be more appropriate approach for control problems involving high unexpected variations in dynamic factors a control action depends on. RL based approaches in airline operations have been attempted. However, existing approaches are focused on using RL to predict taxi out time of flights. Predicting taxi out times can best be consumed by an Estimated Arrival Time (ETA) prediction engine. Thus, the challenging problem of hold time computation for minimizing passenger flight misconnection is not addressed. Another existing work focusses on solving the reconfiguration problem in airlines operations using RL by determining an ideal tail (physical flight) to swap in case of disruptions, if any. Thus, this existing approach has limited application in business as usual (BAU) operations, such as estimating flight hold times for misconnect management, which is primarily in BAU conditions.

SUMMARY

Embodiments of the present disclosure present technological improvements as solutions to one or more of the above-mentioned technical problems recognized by the inventors in conventional systems.

For example, in one embodiment, a method for minimizing passenger misconnects in airline operations through learning is provided. The method comprises identifying a plurality of Reinforcement Learning (RL) agents implemented by the one or more hardware processors, wherein each of the plurality of RL agents corresponds to a flight among a plurality of flights operated by an airline in a training environment, wherein the training environment is one of a simulated airline network generated for the airline operations and a real world airline operations network, and wherein the plurality of RL agents work in parallel in the training environment on a common simulation timeline.

Further, the method comprises initializing each of the plurality of RL agents with a random seed, and a learning rate ($\epsilon$) with a gradual decay, wherein the random seed creates initial conditions for learned knowledge representation and the learning rate ($\epsilon$) controls rate of exploration versus exploitation of each of the plurality of RL agents.

Further, the method comprises training each of the plurality of RL agents, wherein the training is an iterative process and iterations are terminated when each of the plurality of RL agents consistently reaches an optimal value of a Quality (Q) metric indicating quality of the training, wherein the optimal value of Q is identified by a non-changing convergence among the iterations, and wherein steps in each iteration comprising:

a) setting random values for weights of each of the plurality of RL agents in accordance with the initial random seed;

b) determining, by a Machine Learning (ML) based context engine implemented by the one or more hardware processors, a state of each of the plurality of RL agents defining a current state of the flight corresponding to each of the plurality of RL agents, wherein a plurality of features defining the state of each of the plurality of RL agents comprises:

a local passenger utility vector ($\vec{P}_L$) representing a local utility, experienced by passengers of the flight, for every hold time identified for the flight, a local airline utility vector ($\vec{A}_L$) representing the local utility, experienced by the airline operating the flight, for every hold time identified for the flight, an average passenger global utility scalar ($P_G$) representing average global utility experienced by the passengers of all the flights for a past predefined time window, an average global airline utility scalar ($A_G$) representing average global utility experienced by the airline for the past predefined time window, and a hold time guidance value $\tau^*$ indicating a guideline for computing a hold time $\tau$ for the flight;

c) recommending, by each of the plurality of RL agents the hold time $\tau$ for the flight corresponding to each of the plurality of RL agents, wherein the hold time $\tau$ is computed by processing values of the plurality of features of the current state generated for each of the plurality of RL agents in accordance to the weights of each of the plurality of RL agents and underlying neural schema of each of the plurality of RL agents RL agent;

d) applying, in the training environment, the hold time $\tau$ estimated by each of the plurality of RL agents to the flight corresponding to each of the plurality of RL agents to run a first round of the airline operations in the training environment for the plurality of flights in accordance to the hold time $\tau$ estimated by each of the plurality of RL agents;

e) regenerating, by the ML based context engine a revised state to be communicated to each of the plurality of RL agents for a successive round of the airline operations for the flight corresponding to each of the plurality of RL agents;

f) receiving a reward ($R_{t-1}$) by each of the plurality of RL agents from a reward engine for the hold time $\tau$ derived from a local reward $R_L$ and a global reward $R_G$ and a business constant $\beta$ precomputed specific to the airline;

g) revising the values of the weights of each of the plurality of RL agents based on the received reward ($R_{t-1}$); and h) recommending, by each of the plurality of RL agents a revised hold time for the flight corresponding to each of the plurality of RL agents for the successive round of the airline operations for minimizing the passenger misconnects of one or more flights, wherein the revised hold time is computed by processing the revised values of the plurality of features of the revised state regenerated for each of the plurality of RL agents in accordance with the revised values of the weights of each of the plurality of RL agents.

Furthermore, the method comprises utilizing the trained RL agents in real time airline operations to determine the hold time $\tau$ of the flight corresponding to each of the plurality of RL agents in real time.

In another aspect, a system for minimizing passenger misconnects in airline operations through learning is provided. The system comprises a memory storing instructions; one or more Input/Output (I/O) interfaces; and one or more hardware processors coupled to the memory via the one or more I/O interfaces, wherein the one or more hardware processors are configured by the instructions to identify a plurality of Reinforcement Learning (RL) agents implemented by the one or more hardware processors, wherein each of the plurality of RL agents corresponds to a flight among a plurality of flights operated by an airline in a training environment, wherein the training environment is one of a simulated airline network generated for the airline operations and a real world airline operations network, and wherein the plurality of RL agents work in parallel in the training environment on a common simulation timeline.

Further, the one or more hardware processors are configured to initialize each RL agent with a random seed, and a learning rate ($\epsilon$) with a gradual decay, wherein the random seed creates initial conditions for learned knowledge representation and the learning rate ($\epsilon$) controls rate of exploration versus exploitation of each RL agent.

Further, the one or more hardware processors are configured to train each of the plurality of RL agents, wherein the training is an iterative process and iterations are terminated when each of the plurality of RL agents consistently reaches an optimal value of a Quality (Q) metric indicating quality of the training, wherein the optimal value of Q is identified by a non-changing convergence among the iterations, and wherein steps in each iteration comprising:

a) setting random values for weights of each of the plurality of RL agents in accordance with the initial random seed;

b) determining, by a Machine Learning (ML) based context engine implemented by the one or more hardware processors, a state of each of the plurality of RL agents defining a current state of the flight corresponding to each of the plurality of RL agents, wherein a plurality of features defining the state of each of the plurality of RL agents comprises:

a local passenger utility vector ($\vec{P}_L$) representing a local utility, experienced by passengers of the flight, for every hold time identified for the flight, a local airline utility vector ($\vec{A}_L$) representing the local utility, experienced by the airline operating the flight, for every hold time identified for the flight, an average passenger global utility scalar ($P_G$) representing average global utility experienced by the passengers of all the flights for a past predefined time window, an average global airline utility scalar ($A_G$) representing average global utility experienced by the airline for the past predefined time window, and a hold time guidance value $\tau^*$ indicating a guideline for computing a hold time $\tau$ for the flight;

c) recommending, by each of the plurality of RL agents the hold time τ for the flight corresponding to each of the plurality of RL agents, wherein the hold time τ is computed by processing values of the plurality of features of the current state generated for each of the plurality of RL agents in accordance to the weights of each of the plurality of RL agents and underlying neural schema of each of the plurality of RL agents RL agent;

d) applying, in the training environment, the hold time τ estimated by each of the plurality of RL agents to the flight corresponding to each of the plurality of RL agents to run a first round of the airline operations in the training environment for the plurality of flights in accordance to the hold time τ estimated by each of the plurality of RL agents;

e) regenerating, by the ML based context engine a revised state to be communicated to each of the plurality of RL agents for a successive round of the airline operations for the flight corresponding to each of the plurality of RL agents;

f) receiving a reward ($R_{t-1}$) by each of the plurality of RL agents from a reward engine for the hold time τ derived from a local reward $R_L$ and a global reward $R_G$ and a business constant β precomputed specific to the airline;

g) revising the values of the weights of each of the plurality of RL agents based on the received reward ($R_{t-1}$); and h) recommending, by each of the plurality of RL agents a revised hold time for the flight corresponding to each of the plurality of RL agents for the successive round of the airline operations for minimizing the passenger misconnects of one or more flights, wherein the revised hold time is computed by processing the revised values of the plurality of features of the revised state regenerated for each of the plurality of RL agents in accordance with the revised values of the weights of each of the plurality of RL agents.

Furthermore, the one or more hardware processors are configured to utilize the trained plurality of RL agents in real time airline operations to determine the hold time τ of the flight, corresponding to each of the plurality of RL agents, in real time.

In yet another aspect, there are provided one or more non-transitory machine-readable information storage mediums comprising one or more instructions, which when executed by one or more hardware processors causes a method for minimizing passenger misconnects in airline operations through learning. The method comprises identifying a plurality of Reinforcement Learning (RL) agents implemented by the one or more hardware processors, wherein each of the plurality of RL agents corresponds to a flight among a plurality of flights operated by an airline in a training environment, wherein the training environment is one of a simulated airline network generated for the airline operations and a real world airline operations network, and wherein the plurality of RL agents work in parallel in the training environment on a common simulation timeline.

Further, the method comprises initializing each of the plurality of RL agents with a random seed, and a learning rate (ε) with a gradual decay, wherein the random seed creates initial conditions for learned knowledge representation and the learning rate (ε) controls rate of exploration versus exploitation. each of the plurality of RL agents.

Further, the method comprises training each of the plurality of RL agents, wherein the training is an iterative process and iterations are terminated when each of the plurality of RL agents consistently reaches an optimal value of a Quality (Q) metric indicating quality of the training, wherein the optimal value of Q is identified by a non-changing convergence among the iterations, and wherein steps in each iteration comprising:

a) setting random values for weights of each of the plurality of RL agents in accordance with the initial random seed;

b) determining, by a Machine Learning (ML) based context engine implemented by the one or more hardware processors, a state of each of the plurality of RL agents defining a current state of the flight corresponding to each of the plurality of RL agents, wherein a plurality of features defining the state of each of the plurality of RL agents comprises:

a local passenger utility vector ($\vec{P}_L$) representing a local utility, experienced by passengers of the flight, for every hold time identified for the flight, a local airline utility vector ($\vec{A}_L$) representing the local utility, experienced by the airline operating the flight, for every hold time identified for the flight, an average passenger global utility scalar ($P_G$) representing average global utility experienced by the passengers of all the flights for a past predefined time window, an average global airline utility scalar ($A_G$) representing average global utility experienced by the airline for the past predefined time window, and a hold time guidance value τ* indicating a guideline for computing a hold time τ for the flight;

c) recommending, by each of the plurality of RL agents the hold time τ for the flight corresponding to each of the plurality of RL agents, wherein the hold time τ is computed by processing values of the plurality of features of the current state generated for each of the plurality of RL agents in accordance to the weights of each of the plurality of RL agents and underlying neural schema of each of the plurality of RL agents RL agent;

d) applying, in the training environment, the hold time τ estimated by each of the plurality of RL agents to the flight corresponding to each of the plurality of RL agents to run a first round of the airline operations in the training environment for the plurality of flights in accordance to the hold time τ estimated by each of the plurality of RL agents;

e) regenerating, by the ML based context engine a revised state to be communicated to each of the plurality of RL agents for a successive round of the airline operations for the flight corresponding to each of the plurality of RL agents;

f) receiving a reward ($R_{t-1}$) by each of the plurality of RL agents from a reward engine for the hold time τ derived from a local reward $R_L$ and a global reward $R_G$ and a business constant f precomputed specific to the airline;

g) revising the values of the weights of each of the plurality of RL agents based on the received reward ($R_{t-1}$); and h) recommending, by each of the plurality of RL agents a revised hold time for the flight corresponding to each of the plurality of RL agents for the successive round of the airline operations for minimizing the passenger misconnects of one or more flights, wherein the revised hold time is computed by processing the revised values of the plurality of features of the revised state regenerated for each of the plurality of RL agents in accordance with the revised values of the weights of each of the plurality of RL agents.

Furthermore, the method comprises utilizing the trained plurality of RL agents in real time airline operations to determine the hold time τ of the flight corresponding to each of the plurality of RL agents in real time.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1A:
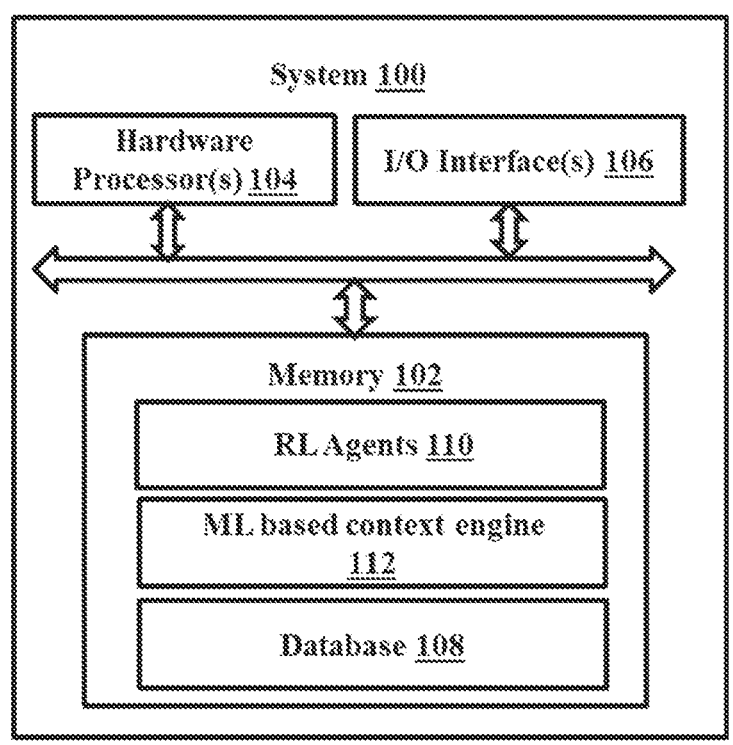
FIG. 1A is a functional block diagram of a system for minimizing passenger misconnects in airline operations through Reinforcement Learning (RL), in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Embodiments herein provide a method and system for minimizing passenger misconnects in airline operations through Reinforcement Learning (RL) by recommending optimal hold time for each flight. Considering the dependency of a flight hold time on multiple dynamic factors, as described in the background section, the method disclosed herein utilizes RL for hold time computation at a flight level considering local factors, while still adhering to global objective of an airline based on global factors. Unlike Machine Learning (ML), the RL based approach does not require huge volume of labelled data to start working. The RL agents can learn on the job and can be trained on a simulated environment with synthetic data or can be trained in a real-world environment of airline operations.

Referring now to the drawings, and more particularly to FIGS. 1 through 11, where similar reference characters denote corresponding features consistently throughout the figures, there are shown preferred embodiments and these embodiments are described in the context of the following exemplary system and/or method.

FIG. 1A is a functional block diagram of a system 100 for minimizing passenger misconnects in airline operations through Reinforcement Learning (RL), in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100, with the processor(s) is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, personal digital Assistants (PDAs), cloud servers and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 102 may comprise a plurality of modules such as multiple RL agents 110, a ML based context engine 112 and a reward engine (not shown) and so on, to implement the functions for minimizing passenger misconnects in airline operations through Reinforcement Learning (RL).

A neural network is a network of nodes (neurons) that try to understand the underlying relationship in a set of data like how the human brain operates. Neural networks can adapt to changing input; so, the network generates the best possible result without needing to redesign the output criteria. An example neural schema of a Neural Network (NN) implementing the RL agents 110 is described below. NN schema used herein can have one input layer, one hidden layer and an output layer. The layers are connected by weighted edges. These weighted edges aid the learning of the NN. As the network evolves these weights get altered as per the rewards it receives. The neural architecture follows the architecture of the state space and the output space.

The ML based context engine 112 can be implemented using data feeds from the database 108 and a trained offline ML model for the context engine. The ML model can be one among a plurality of known machine learning models. The reward engine comprises data feeds from the database 108. The engine is built based on the weighted sum model (WSM) which considers the actual local and global utilities.

Further, the memory 102 may include a database 108, which may store states corresponding to each RL agent determined by the ML based context engine 112, rewards computed for each RL agent by the reward engine 114, hold times for each corresponding flights computed by each of the RL agents 110 during training and testing phase and so on.

Figure 1B:
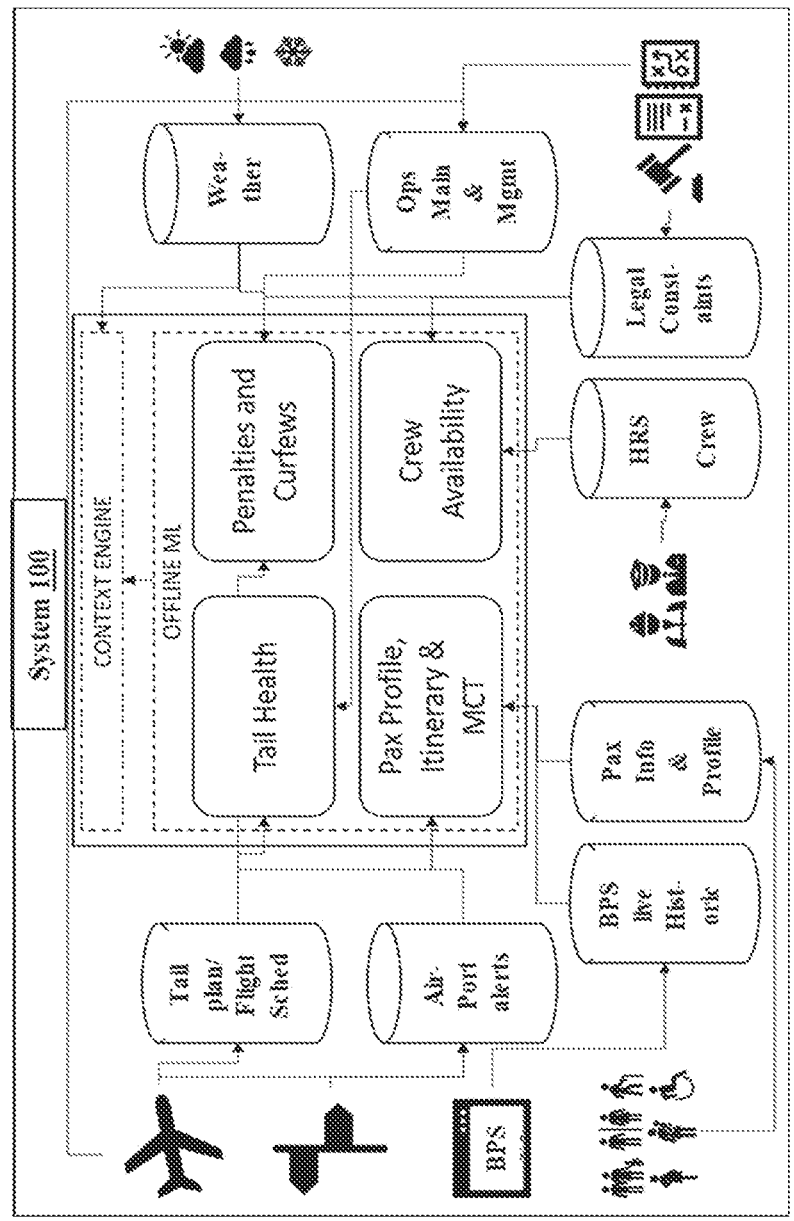
FIG. 1B illustrates a high level architectural overview of an airport environment implementing the system of FIG. 1, in accordance with some embodiments of the present disclosure.

Referring to FIG. 1B, the FIG. 1B illustrates a high level architectural overview of an airport environment, implementing the system of FIG. 1A, in accordance with some embodiments of the present disclosure. The database 108 may include plurality of information blocks of the system 100 such as the tail plan and flight schedule block that consist of all the relevant flight and tail level information from planning systems and onboard sensors on the aircraft. An airport alerts block, which receives data from the flights, ground and terminal about the live updates on any congestion, disturbance or changes. A Boarding Pass Scanning system (BPS) block, which has both the historic and live data from all BPS points in the airport and keeps track of the passenger specific gate to gate (Pax specific G2G) score. The passenger (Pax) information and profile block, which has all the passenger itineraries and their related profiles, which were generated from all the non-Personally Identifiable Information (non-PII) data available. Human Resource System (HRS) block provides all the crew related details including current deployment details. The Legal and Domain Constraints block provides the set of all rules that are to be adhered to for all operations. Operations and Maintenance management block contains all the operations specific details along with the maintenance plan for all aircrafts (physical flights). The weather data is obtained from a trusted third party. Thus, all information in the above blocks is gathered and complied by the system 100 by communication with one or more external sources via the I/O interface 106. Referring to FIG. 1B, the database 108 may include information required by the ML based context engine 112 (alternatively referred as context engine) such as tail health (health of a physical flight scheduled for the trip), flight crew availability, penalties and curfew, passenger (Pax) profile, passenger specific Minimum Connection Time (Pax specific MCT) and the like. All the information compiled in the database 108, may be collected by the system 100 from external information sources associated with the airport via the I/O interface (106).

Further, the memory 102 may comprise information pertaining to input(s)/output(s) of each step performed by the processor(s) 104 of the system 100 and methods of the present disclosure.

In an embodiment, the database 108 may be external (not shown) to the system 100 and coupled to the system via the I/O interface 106. Functions of the components of system 100, for minimizing passenger misconnects in airline operations through RL, are explained in conjunction with FIGS. 2A through 11 providing flow diagram, architectural overviews and performance analysis of the system 100.

Figure 2A:
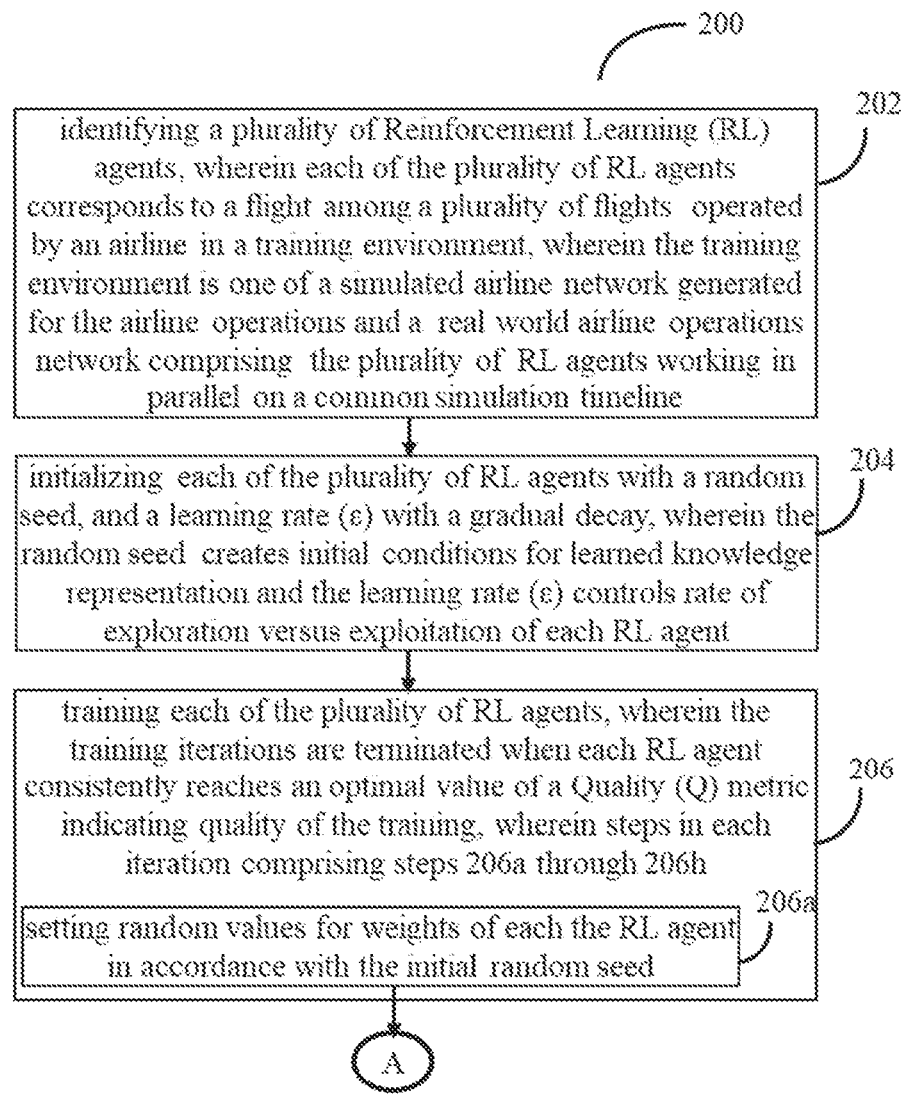
FIGS. 2A, 2B and 2C depict a flow diagram illustrating a method for minimizing passenger misconnects in airline operations through the RL using the system of FIG. 1, in accordance with some embodiments of the present disclosure.
Figure 2B:
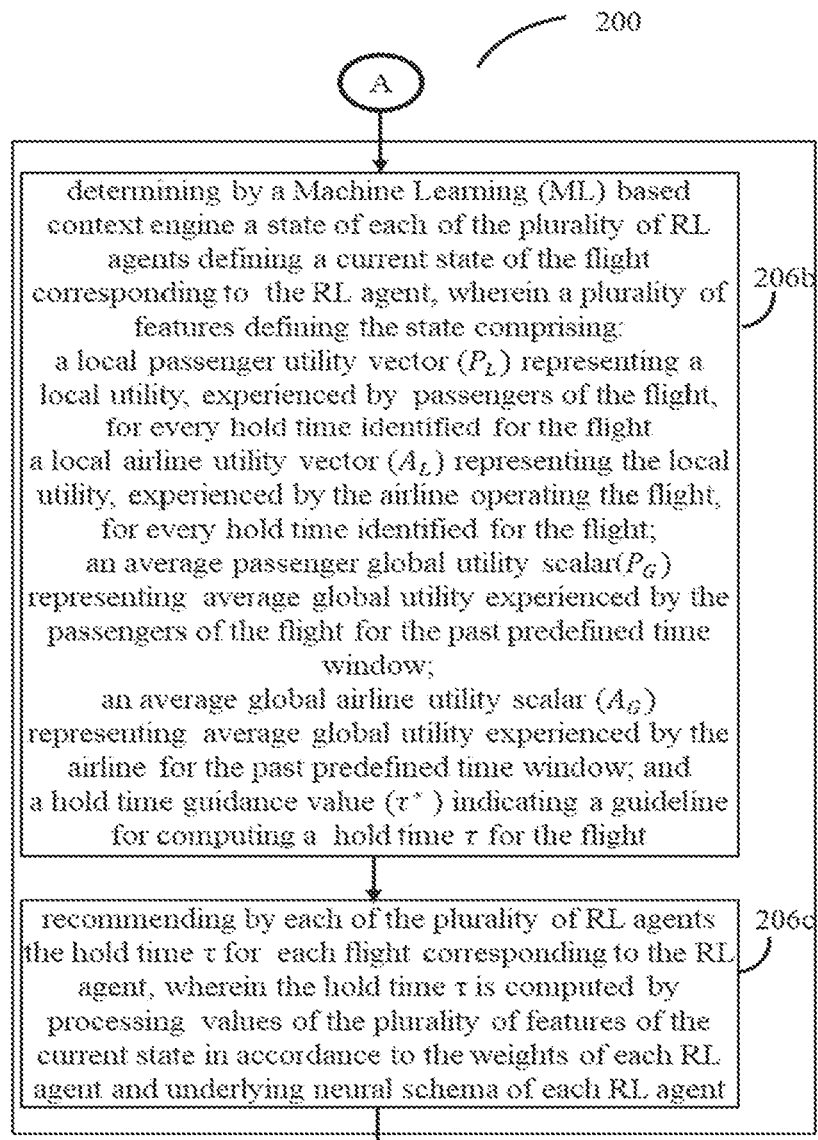
Figure 2C:
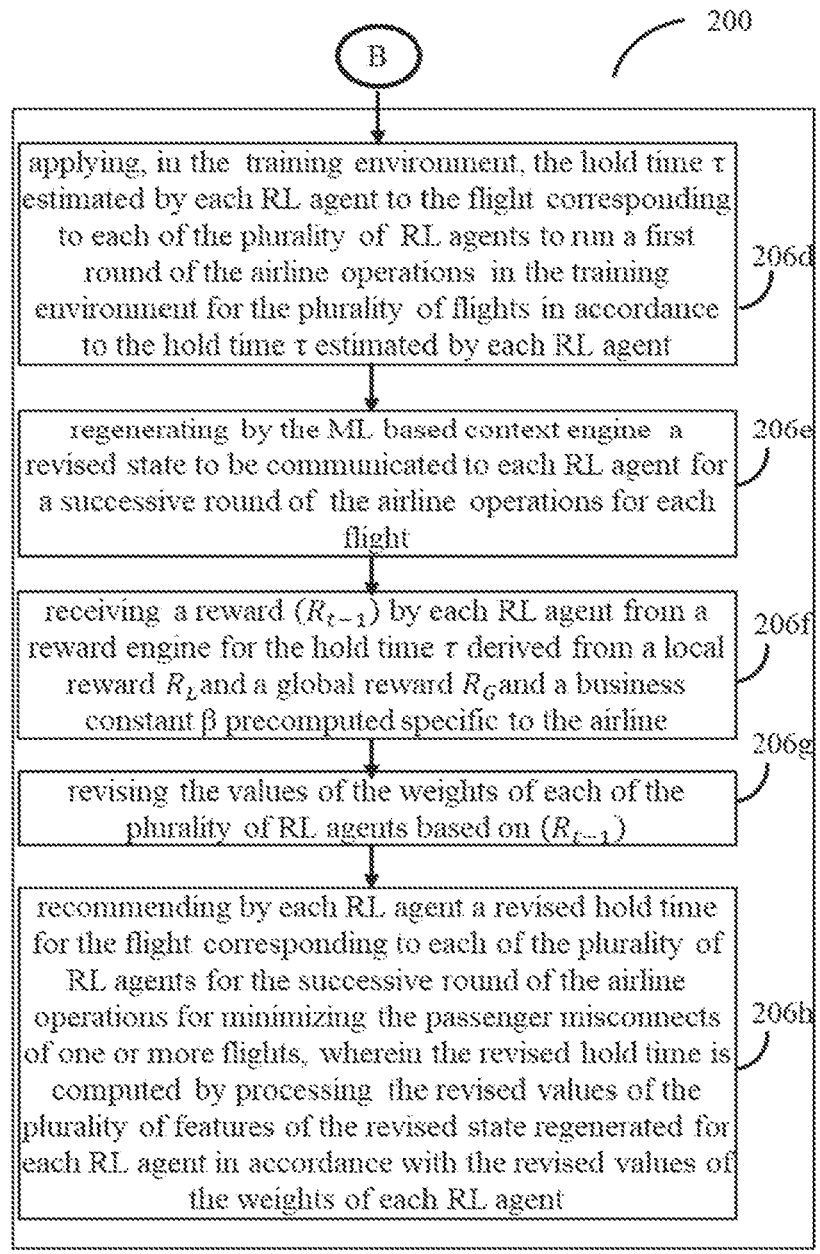

FIGS. 2A, 2B and 2C depict a flow diagram illustrating a method 200 for minimizing passenger misconnects in airline operations through RL using the system 100 of FIGS. 1A and 1B, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIGS. 1A and 1B and the steps of flow diagram as depicted in FIGS. 2A through 2C. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring now to the steps of the method 200, at step 202, one or more hardware processors 104 are configured to identify a plurality of Reinforcement Learning (RL) agents (such as RL agents 110) implemented by the one or more hardware processors 104. Each RL agent among the plurality of RL agents corresponds to a flight among a plurality of flights operated by an airline in a training environment. The training environment provides two options, one using a simulated airline network generated for the airline operations and second a real-world airline operations network. The plurality of RL agents work in parallel in the training environment on a common simulation timeline.

Each type of training environment has its own advantages. The simulated environment, which can be generated using well known open source tools, enables generating data of all forms to represent that various possible scenarios and train the agent. In the real world, data generation is limited to only those possibilities that have already happened, thus leading to sub optimal training. However, disadvantage of simulation is that all data is generated based on historic data and so they may not be fully accurate. The simulation cannot possibly capture all possible real-world changes. Thus, using the real-world airline operations network for training environment exposes the RL agents to the constraints/challenges of the real-world operations.

At step 204 of the method 200, one or more hardware processors 104 are configured to initialize each RL agent with a random seed, and a learning rate ($\varepsilon$) with a gradual decay. Basically, the neural network has nodes and edges through which it parses the inputs to determine the output. These random weights sort of help guide the agent to determine the output based on the input. The random seed creates initial conditions for learned knowledge representation and the learning rate ($\varepsilon$) controls rate of exploration versus exploitation of each RL agent. As understood, the exploration phase allows the RL agent to take sub optimal decisions so as to understand the impact of all actions before it settles in on what is optimal, while the exploitation phase enables the RL agent to utilize the learnt knowledge to arrive at a decision. Once the RL agents are initialized, at step 206 of the method 200, one or more hardware processors 104 are configured to train each RL agent. The RL agent, interchangeably referred as agent herein, is trained specifically for a flight using real world or synthetic data. The training environment can be a virtual simulation environment or the real-world airline operation network. This way the agent can learn on years' worth of flight and passenger patterns in a very short span. Post individual training, the trained agents with independently learned internal knowledge co-learn over a shared timeline where they learn to compete and/or co-operate to align with the global business requirements. Over time each of the agent learns to pick the globally optimal hold time ignoring the local optima. The learning is typically stored in the neural schema of the agent. The training is an iterative process and iterations are terminated when each RL agent consistently reaches an optimal value of a Quality (Q) metric indicating quality of the training.

The training process of the RL agents is explained in conjunction with steps 206a through 206h of method 200.

Figure 3:
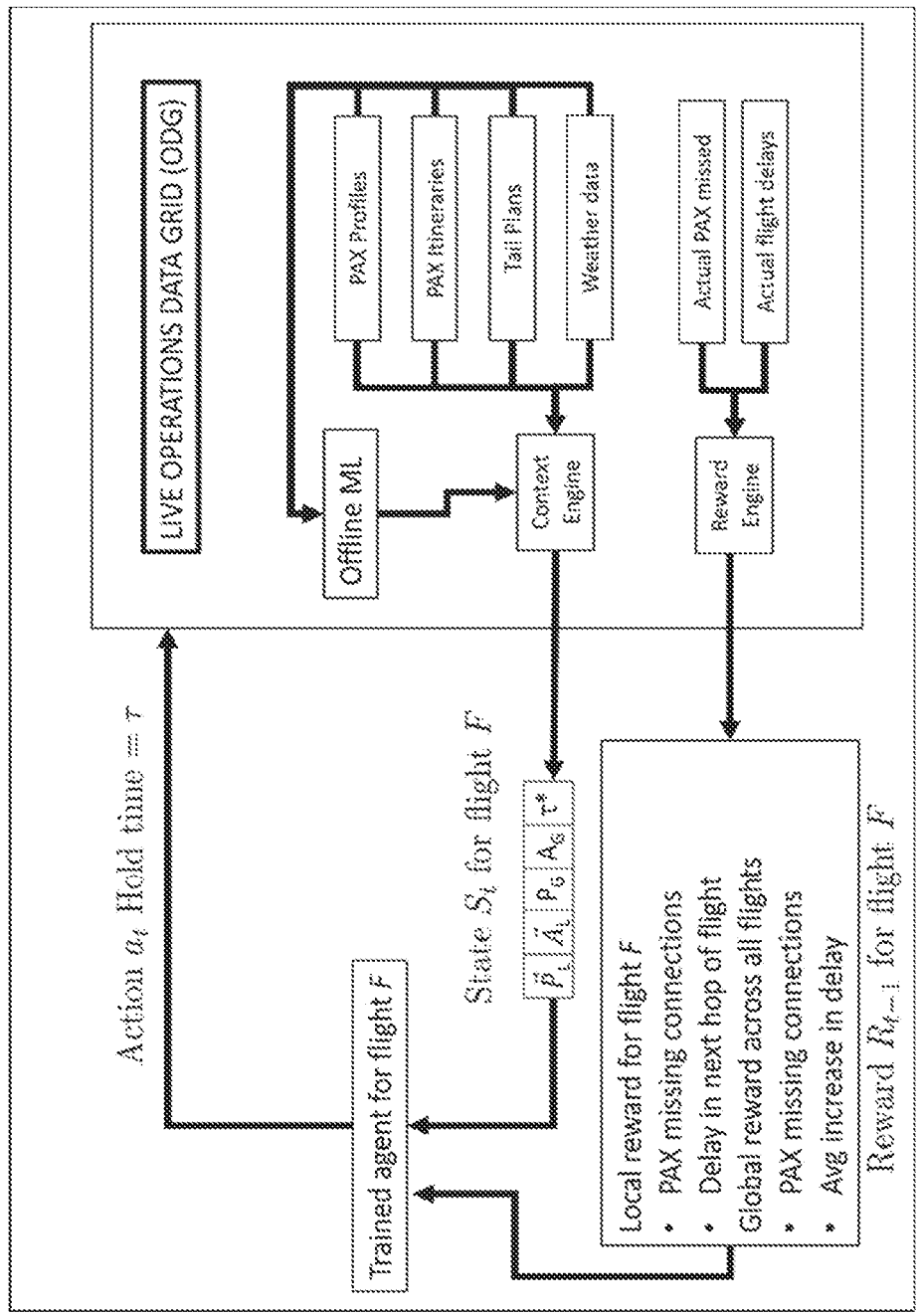
FIG. 3 illustrates interaction of components of the system of FIG. 1, wherein the system utilizes Machine Learning (ML) based context engine for determining a current state of each RL agent, in accordance with some embodiments of the present disclosure.

Training Pre-Requisites a. Training environment comprises a high-fidelity simulation of the airline operations or a real-world airline operations network.
b. Pretrained offline ML based context engine 112, is used to determine a state S(t), interchangeably referred as state (s), of each RL agent defining a current state of the flight corresponding to the RL agent. The state is a portable representation of flight's current status and comprises a plurality of features defining the current state of each RL agent. A portable state is one that can be used across various flights immaterial of their size, seating capacity, age, type, flying duration etc. This approach utilized by the method disclosed enables easy reuse of the state definition without any flight/aircraft specific dependency. The ML based context engine 112 applies regression techniques for one or more flight parameters comprising passenger (Pax) specific Minimum connection Time (Pax specific MCT) based on Gate to Gate (G2G) score prediction, crew availability, and tail health along with dimensionality reduction technique. The ML based context engine 112 further applies clustering techniques for Pax profiling. The ML based context engine 112 further applies transformations to real-world data concerning airline operations and passenger itineraries and current location and status of the passenger between gates in an airport derived from passenger history. The data related to airline operations, passenger itineraries and the like can be tracked and obtained in real time. However, real time tracking of passenger within an airport without a dedicated hardware device is difficult. Further, there are constraints in tracking movement of a passenger considering privacy issues or the like. Thus, it is practically not feasible to track movement of each passenger for every flight and also these decisions are made way in advance, even before the passenger has landed. Thus, data associated with movement pattern of a passenger in general is derived by the system 100 using passenger airport movement history such as check in time, security check time, check out times and the like. As depicted in FIG. 3, the system 100 considers a wide variety of data from various sensory systems to decide on the quantum of hold. The approach leverages ML based context engine 112 (offline ML+Context engine) to generate the state to be presented to the RL agent. The context engine basically takes into account all the historic data available from the sensory systems like Gate to Gate (G2G) score from the Boarding Pass Scanning system (BPS), passenger profiles that are non-PII from the booking system, operation information like tail plan, tail health, pilot/crew/ground staff availability and legality from the resource management system, penalties and constraints from the legal system, maintenance schedules from the operations system and the weather data from the metrological system.

c. RL agents are initialized with some random weights and learning rate ($\varepsilon$) such as $\varepsilon=1$ with gradual decay is set.

Training a. Full-scale network simulation is started with the initial random seed on a common timeline.
b. The context engine is invoked, for example, 3 hours, prior to each flight's take off to compute the state for the current departure and passes it to the flight's RL agent. The 3 hours window can provide the operations team to better plan for any potential delays. Like extending the gate renting, getting the ground staff ready etc.

The steps 206a through 206h, followed during each iteration of RL agent training, comprise:

1. Setting (206a) random values for weights of each the RL agent in accordance with the initial random seed.
2. Determining (206b) by the Machine Learning (ML) based context engine 112 implemented by the one or more hardware processors 104, the state S(t), of each RL agent defining a current state of the flight corresponding to the RL agent. The state S(t), which is the portable representation of flight's current status comprises the plurality of features defining the current state of each RL agent. The portable nature of the state S(t) makes it easier to perform transfer learning and have a unified design for the ML based context engine. The ML based context engine 112 digest vast data and compresses it into a compact 6 component state that still provides the agent with all the necessary knowledge to compute the optimum hold. The S(t) is as provided below:

$$\vec{P}_L \quad \vec{A}_L \quad P_G \quad A_G \quad \tau^* \qquad (1)$$

wherein, a local passenger utility vector ($\vec{P}_L$) represents a local utility, experienced by passengers of the flight, for every hold time identified for the flight, a local airline utility vector ($\vec{A}_L$) represents the local utility, experienced by the airline operating the flight, for every hold time identified for the flight, an average passenger global utility scalar ($P_G$) represents average global utility experienced by the passengers of all the flights for the past predefined time window, an average global airline utility scalar ($A_G$) represents average global utility experienced by the airline for the past predefined time window; and a hold time guidance value τ* indicating a guideline for computing a hold time τ for the flight. The τ* is derived from the local passenger utility vector ($\vec{P}_L$), local airline utility vector ($\vec{A}_L$) and a business constant (α) computed specific to the airline, wherein (α) enables adjusting impact of the airline and local passenger utility vector ($\vec{P}_L$), on the local reward. The term business herein refers to any airline implementing the system 100 in its airline operations.

| | | |
|---|---|---|
| $\vec{P}_L$ | $P_L(\tau) = $ Expectation (E)[Passenger missing flight F\hold = τ] | (2) |
| $\vec{A}_L$ | $A_L(\tau)$ = E [Delay of flight F at destination\hold = τ] | |
| $P_G$ | $P_G$ = Average passengers missing flights currently | |
| $A_G$ | $A_G$ = Average delays in flights currently | |
| τ* | τ* = $\arg_\tau \min[\alpha P_L(\tau) + (1-\alpha)A_L(\tau)]$ | |

Computations and approach involved in computing $\vec{P}_L$ and $\vec{A}_L$ are explained in conjunction with FIGS. 8 through 11.

3. Recommending (206c), by each RL agent the hold time τ for each flight corresponding to the RL agent, wherein the hold time τ is computed by processing values of the plurality of features of the current state generated for each RL agent in accordance to the weights of each RL agent and underlying neural schema of each RL agent. The state values are fed to the neural network of the RL agent at the input layer, the values for each input node activates a transition to the output layer through a hidden layer. Over time the network learns what should be the best decision given a set of input values so as to attain optimal result (herein hold time). As can be understood by person skilled in the art, the way the neural network works is common across all RL approaches, the only difference is how many nodes each layer has, how many hidden layers are present and what activation function is being used. Specifically, the neural network Is customized to the engineered state used for the RL.

4. Applying (206d), in the training environment, the hold time τ estimated by each RL agent to each flight corresponding to the RL agent to run a first round of the airline operations in the training environment for the plurality of flights in accordance to the hold.

5. Regenerating (206e), by the ML based context engine 112, a revised state to be communicated to each RL agent for a successive round of the airline operations for each flight.

6. Receiving (206f) the reward ($R_{t-1}$) by each RL agent from a reward engine for the hold time τ derived from a local reward $R_L$ and a global reward $R_G$ and a business constant f precomputed specific to the airline, wherein (β) enables adjusting balance of the reward towards local or global optima. The local reward ($R_L$) comprises an actual local passenger utility ($\hat{P}_L$) component and an actual local airline utility ($\hat{A}_L$) combined using the business constant (α). The global reward ($R_G$) comprises average of all the local rewards ($R_{Ls}$) of the plurality of flights operated in last round.

$$R_{t-1} = \beta R_L + (1-\beta)R_G \quad (3)$$

$$R_L = \alpha \hat{P}_L + (1-\alpha)\hat{A}_L \quad (4)$$

$$R_G = \frac{\sum_f \alpha \hat{P}_L^f + (1-\alpha)\hat{A}_L^f}{N_f} \quad (5)$$

a) Reward ($R_{t-1}$) is a delayed reward which the agent receives when it is due to process the next state and consists of the local ($R_L$) and the global ($R_G$) reward components. These are combined using the business constant (β). β can be used by business to adjust the balance of the reward towards local or global optima.

b) The local ($R_L$) reward has two components—the actual local passenger utility ($\hat{P}_L$) and the actual local airline utility ($\hat{A}_L$). These are combined using the business constant (α). α can be used by business to tradeoff between saving passengers (PAX utility) and minimizing delay (airline utility).

c) The global ($R_G$) reward is simply the average of all the local rewards of flights that have flown in the last round (where for example each round is of one day or 24 hours).

d) This reward mechanism disclosed by the method heavily influence the ability of the RL agent to learn quickly and even learn the errors in the ML based context engine 112. The disclosed reward mechanism with the business constant α the business constant β provides levers for business to adjust operations.

Alpha (α) is the business constant used to form the weighted sum of the local passenger utility ($\vec{P}_L$) and airline utility ($\vec{A}_L$). Consider an example where $\vec{P}_L$=0.81, 0.88, 0.85 and 0.79 and $\vec{A}_L$=1, 0.97, 0.89 and 0.85 for the hold options 0, 10, 20 and 30 minutes. If α was 0.2 then 0-minute hold would be optimal, if α was 0.7 then 10-minute hold will be optimal and if α was 0.9 then 20-minute hold will be optimal. The choice of α is simply a business decision as to where the airline want to operate in the passenger friendliness to airline efficiency scale.

Beta (β) is the business constant used to form the weighted sum of local reward ($R_L$) and global reward ($R_G$). It mathematically works very similar to α but helps to determine the overall reward. β gives business the control on how much weightage should be given to local and global reward components.

7. Revising (206g) the values of the weights of each RL agent based on the received reward ($R_{t-1}$).

8. Recommending (206h), by each RL agent, a revised hold time for each flight corresponding to the RL agent for the successive round of the airline operations for minimizing the passenger misconnects of one or more flights, wherein the revised hold time is computed by processing the revised values of the plurality of features of the revised state regenerated for each RL agent in accordance with the revised values of the weights of each RL agent.

The optimal value of Q defining the termination condition for the training process is a minimal value of root mean square error (RMSE) obtained among the iterations.

Q Metric or Q Function: Usually denoted as Q(s, a) (sometimes with a π subscript, and sometimes as Q(s, a; θ) in Deep RL), wherein the value of the Q metric is a measure of the overall expected reward of the RL agent assuming the agent is in state s or S(t) at time t and performs action 'a' at time 't' ($a_t$) to compute the hold time τ as can be seen in FIG. 3, and then continues playing/running until the end of the episode following some policy π. The Q metric is defined mathematically as follows:

$$Q(s,a) = E[\Sigma_{n=0}^{N} \gamma^n r_n] \quad (6)$$

where N is the number of states from state 's' till the terminal state, 'γ' is the discount factor and '$r_0$' is the immediate reward received after performing action 'a' in state 's'.

The learnt knowledge of the plurality of trained RL agents is transferred to a new RL agent associated with a new flight entering the airlines as the state defined for any RL agent is portable across the plurality of flights. Thus, training of the new RL agent can start from the pre-acquired learnt knowledge. Further, since state of the RL agent is portable across the plurality of flights, this enables utilization of a single RL agent for the plurality of flights. As stated earlier, the state is a portable representation of flight's current status and can be used across various flights immaterial of their size, seating capacity, age, type, flying duration etc. This approach utilized by the method disclosed enables easy reuse of the state definition without any flight/aircraft specific dependency. The efficiency comes from the fact that it digests vast data and compresses it into a compact 6 component state that still provides the agent with all the necessary knowledge to compute the optimum hold.

Upon completion of the training, the RL agents are deployed in real time airline operations to determine the hold time τ of each flight in real time. In an embodiment, when working in the test scenario (real time airline operations) the hold time τ computed by the system 100 can be provided as a recommendation to operators of the airline, while final decision applying the hold time can be left to the final decision of the operators. This ensures a final cross check on the system decision.

Precondition for Testing: All the ones applicable for training with learning rate set to 0 for the RL agent.

Testing:
a) The context engine 112 is invoked 3 hours prior to real world/shadow simulation flight take off and it computes the state for the current departure and passes it to the flight's RL agent.
b) The RL agent consumes the state and generates the optimal hold recommendation (hold time τ).
c) The hold τ is then implemented in the real world/simulation.
d) When the next day's flight is to be simulated the RL agent is presented with the state representation of the day and the reward of the prior day.

Examples: Consider a case where the hold options (τ) for a flight are 0, 10, 20 and 30

For each hold (τ) option the local passenger and airline utilities (with α as 0.7) are as in Table 1:

TABLE 1

| Hold | $P_L(\tau)$ | $A_L(\tau)$ | 0.7* $P_L(\tau)$ + 0.3 $A_L(\tau)$ |
|---|---|---|---|
| 0 | 0.57 | 1 | 0.699 |
| 10 | 0.79 | .93 | 0.832 |
| 20 | 0.88 | .86 | 0.874 |
| 30 | 0.91 | .77 | 0.868 |

Hence the locally optimal hold (τ*) is 20 (computed in accordance to equation for (τ*) given in equation 2).

From the simulation it is known that $P_G$ is 0.92 and $A_G$ is 0.83

So, the state S(t) is as shown in Table 2 below:

TABLE 2

| $\vec{P}_L$ | $\vec{A}_L$ | $P_G$ | $A_G$ | $\tau*$ |
|---|---|---|---|---|
| [0.57, 0.79, 0.88, 0.91] | [1, 0.93, 0.86, 0.77] | 0.92 | 0.83 | 20 |

Assume, the RL agent recommends a hold time τ of 30 mins

From the simulation, it can be known that
  $R_G$ is 0.9 (based on the flights flown in the last 24 hours)
  $\hat{P}_L = 0.91$
  $\hat{A}_L = 0.80$ If it is assumed that β is 0.6, then the final reward,
  $R_{t-1} = (0.6*((0.7*0.91)+(0.3*0.8)))+(0.4*(0.9)) = 0.882$ System Performance: The method 200 disclosed herein is tested on a micro simulator. A scenario (first example scenario) is considered, where the global utility is not directly impacted by the local action and the global utility does not dominate the reward. The scenario considers roughly 3 years' worth of data generated offline. Three standard RL techniques Deep Q-Network (DQN), Actor Critic (AC) and Advantage Actor Critic (A2C) were used to validate the method disclosed, wherein the simulator was run for 30 k to 300 k simulations.

Figure 4:
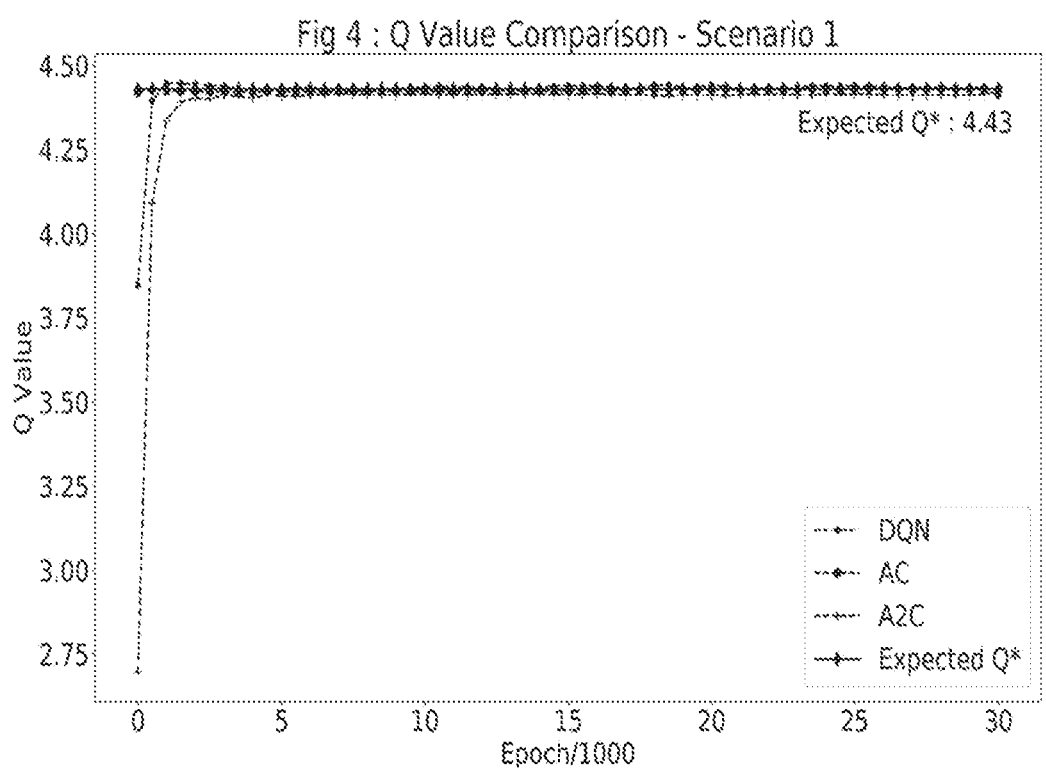
FIG. 4 is a Quality (Q) value plot for a first example scenario, depicting training performance of the RL agents in terms of (Q) metric, in accordance with some embodiments of the present disclosure.
Figure 5:
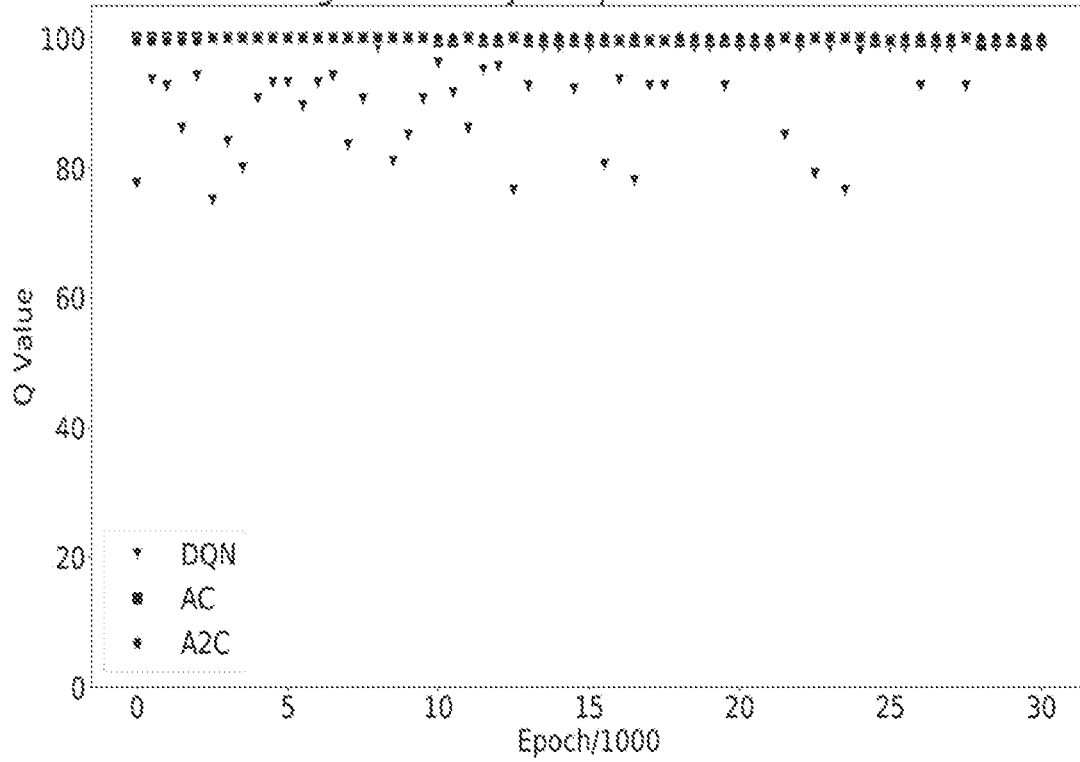
FIG. 5 is an accuracy plot depicting accuracy of hold time estimations for flights as recommended by the RL agent, trained for the first example scenario, when tested on flights in real word airline operations, in accordance with some embodiments of the present disclosure.

FIG. 4 is Quality (Q) value plot for a first example scenario (toy scenario), depicting training performance of the RL agents in terms of (Q) metric, in accordance with some embodiments of the present disclosure. FIG. 4 shows the Q value convergence of the three RL techniques along with the theoretically optimal Q value. Q Value is a measure of the overall expected reward assuming the agent is in state s and performs action a, and then continues playing until the end of the episode following some policy π. In simpler terms Q value gives an idea of the maturity of the agent training. The techniques mentioned are different approaches to implementing reinforcement learning. The 3 methods are Deep Q Network (DQN), Actor Critic (AC) and Advantage Actor Critic (A2C). While DQN leverages a Neural Network to estimate the Q-value function, AC and A2C are policy gradient approaches FIG. 5 is an accuracy plot depicting accuracy of hold time estimations for flights as recommended by the RL agent, trained for the first example scenario, when tested on flights in real word airline operations, in accordance with some embodiments of the present disclosure. As seen in FIG. 5, the 3 approaches reach near 100% test accuracy with a mere 5% tolerance factor.

Figure 6:
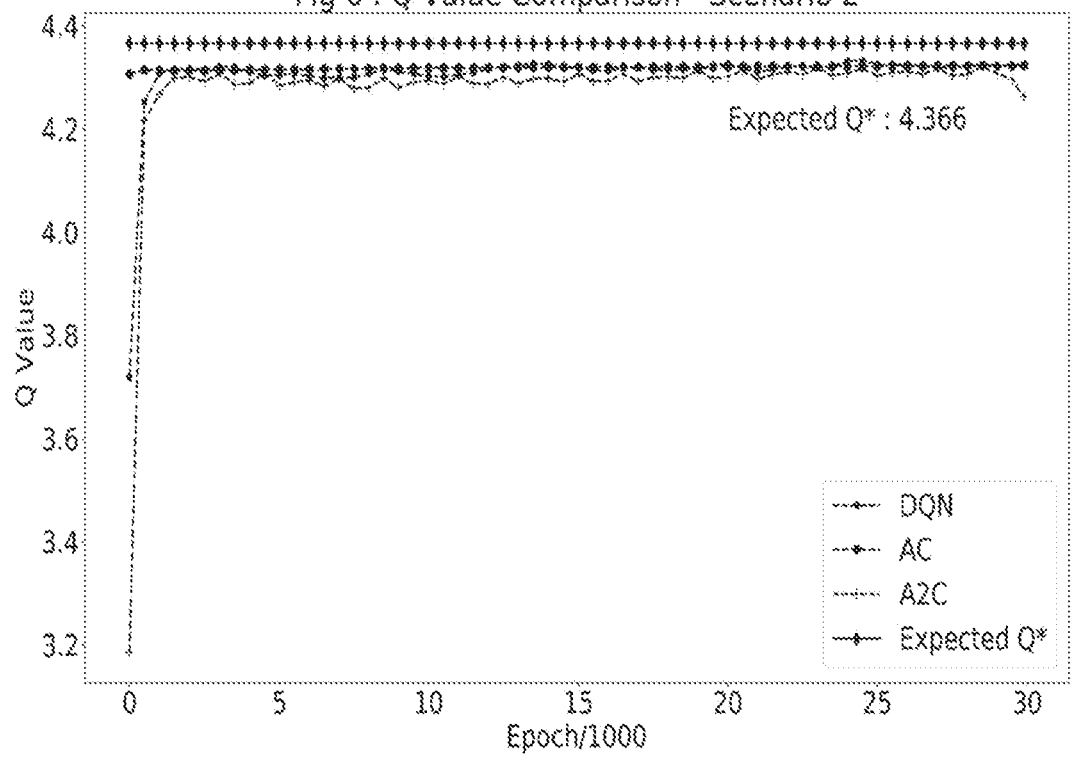
FIG. 6 and FIG. 7 are the (Q) value plots for a second and third example scenario, depicting training performance of the RL agents in terms of the Q metric, in accordance with some embodiments of the present disclosure.
Figure 7:
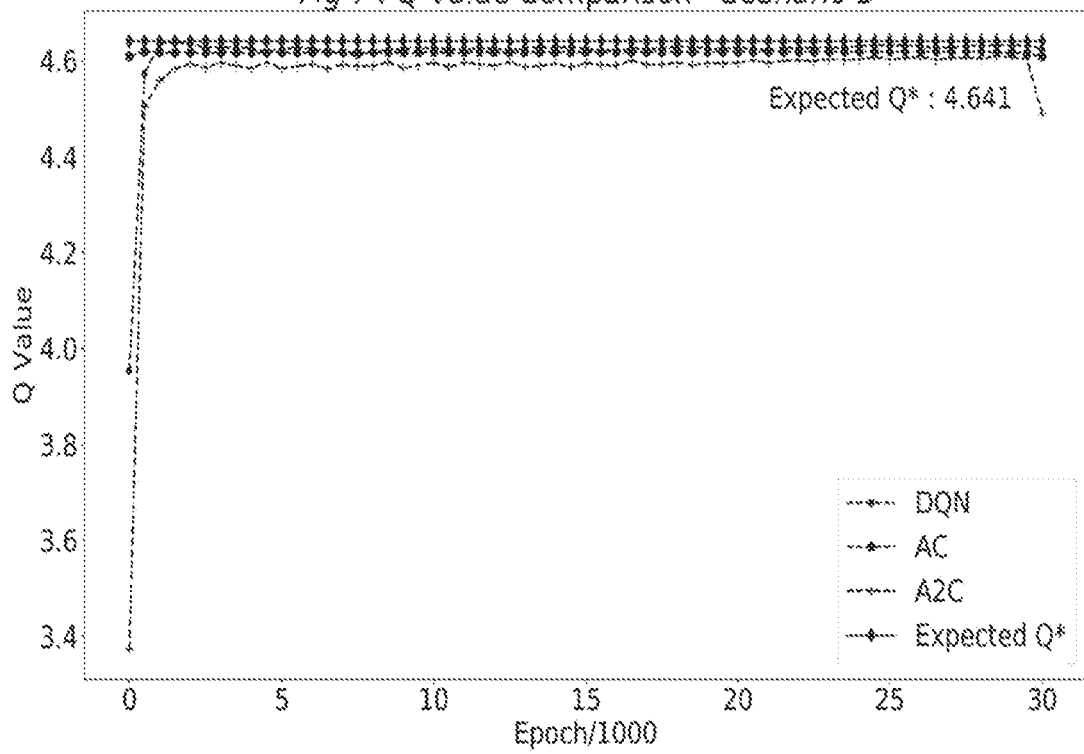

FIG. 6 and FIG. 7 are the (Q) value plots for a second and third example scenario, depicting training performance of the RL agents in terms of the Q metric, in accordance with some embodiments of the present disclosure. The method disclosed herein is further tested on additional two different scenarios where the global utility depends on the local action and can either a) dominate the reward or b) not dominate the reward. In both cases it is identified that the Q value converges, as seen in FIGS. 6 and 7, thus providing conclusive evidence that the method and system disclosed herein provides a workable solution for optimal hold time recommendations.

Figure 8:
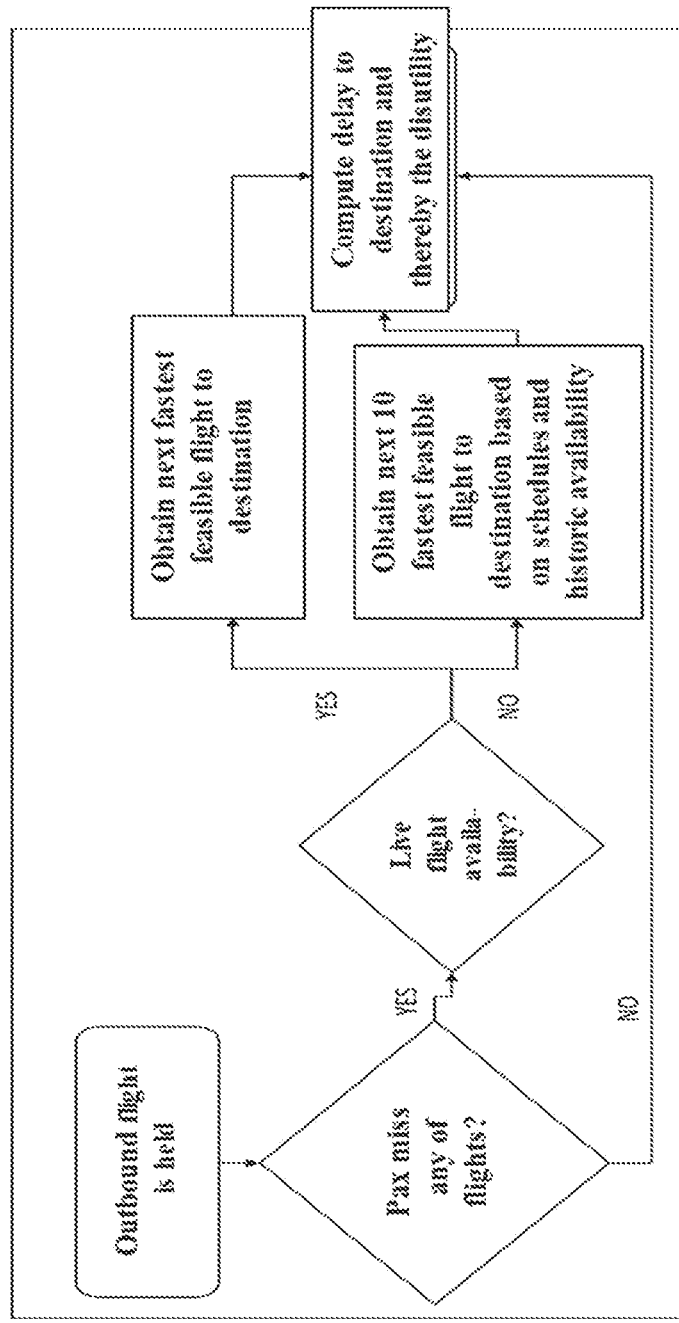
FIG. 8 depicts steps for passenger disutility computation used by method of FIG. 2 to further derive passenger utility, in accordance with some embodiments of the present disclosure.

FIG. 8 depicts steps for passenger disutility computation used by method of FIG. 2 to further derive passenger utility, in accordance with some embodiments of the present disclosure.

Passenger Disutility: The passenger disutility, as shown in FIG. 8, is the sum of the disutility of all passengers flying on that flight. For those passengers who do not miss the current or further connections the disutility is simply the additional delay to the destination. For those who miss any of their connections the disutility is the delay to the destination of the revised itinerary as compared to the original itinerary. A hard constraint of maximum passenger delay of x hours is enforced (typically 24 hours).

$$P_{disutility} = \frac{T_i}{T_{max}}, T_{max} = x \text{ hours} \qquad (7)$$

Where, value of $T_i$ depends on w, which indicates the number of connections based on the inbound ETA of held flight and is determined by ($ETD_{ot}-ETA_{it}<MCT$) of the held flight, where ETA is Expected Time of Arrival and ETD is Expected Time of Departure of the flight.

If w=0, then $T_i=T_{max}$

If w>0, then $T_i=(\sum_{w=1}^{\leq 10}(\Pi_{j=1}^{w-1}(1-pj))PwDw)/\Sigma Pw$ where $p_j$ is the probability of getting a seat on any of the other flights considered so far, Pw represents the probability of getting a seat in flight w and Dw represents the delay to the destination of flight w.

The challenging aspect of computing passenger disutility involves 2 major items 1) Alternate route availability and 2) Passenger's connection time.

Alternate route availability: If access to the passenger scheduled-booking system (PSS) is readily available, then this problem of route availability does not exist and a single service call yields the required information. But typically, this access is not available and so it is required to base the availability prediction on the flight schedules and historic availability. For this, the next 10 fastest routes to destination are taken and the historic availability of the routes is retrieved to represent the probability of getting a seat and the same are combined to arrive at a representational delay to the destination and thereby the disutility.

Figure 9:
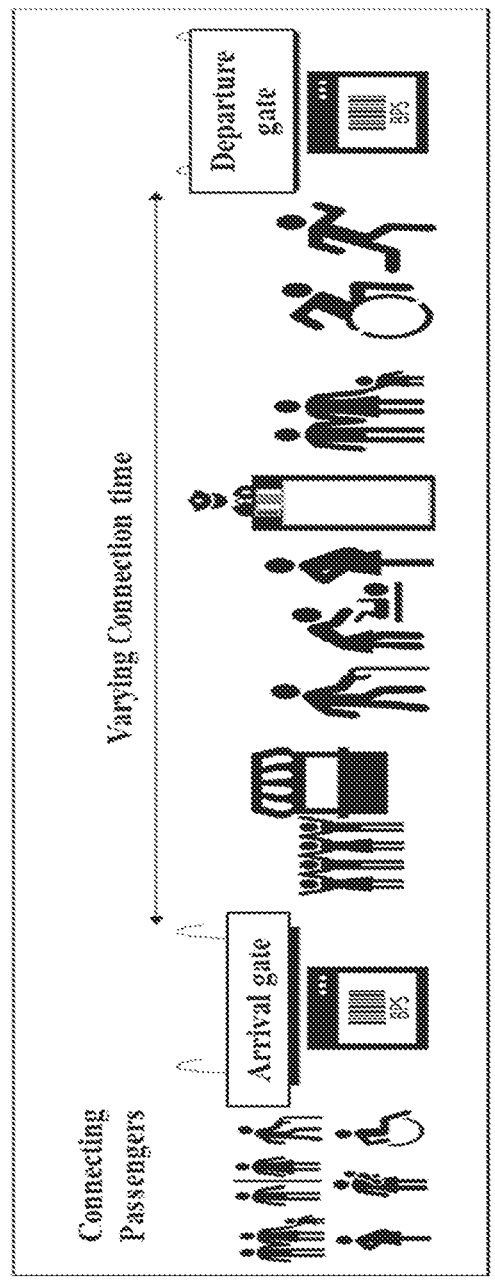
FIG. 9 is a schematic representing factors contributing to variation in gate to gate connection time of passengers, in accordance with some embodiments of the present disclosure.
Figure 10:
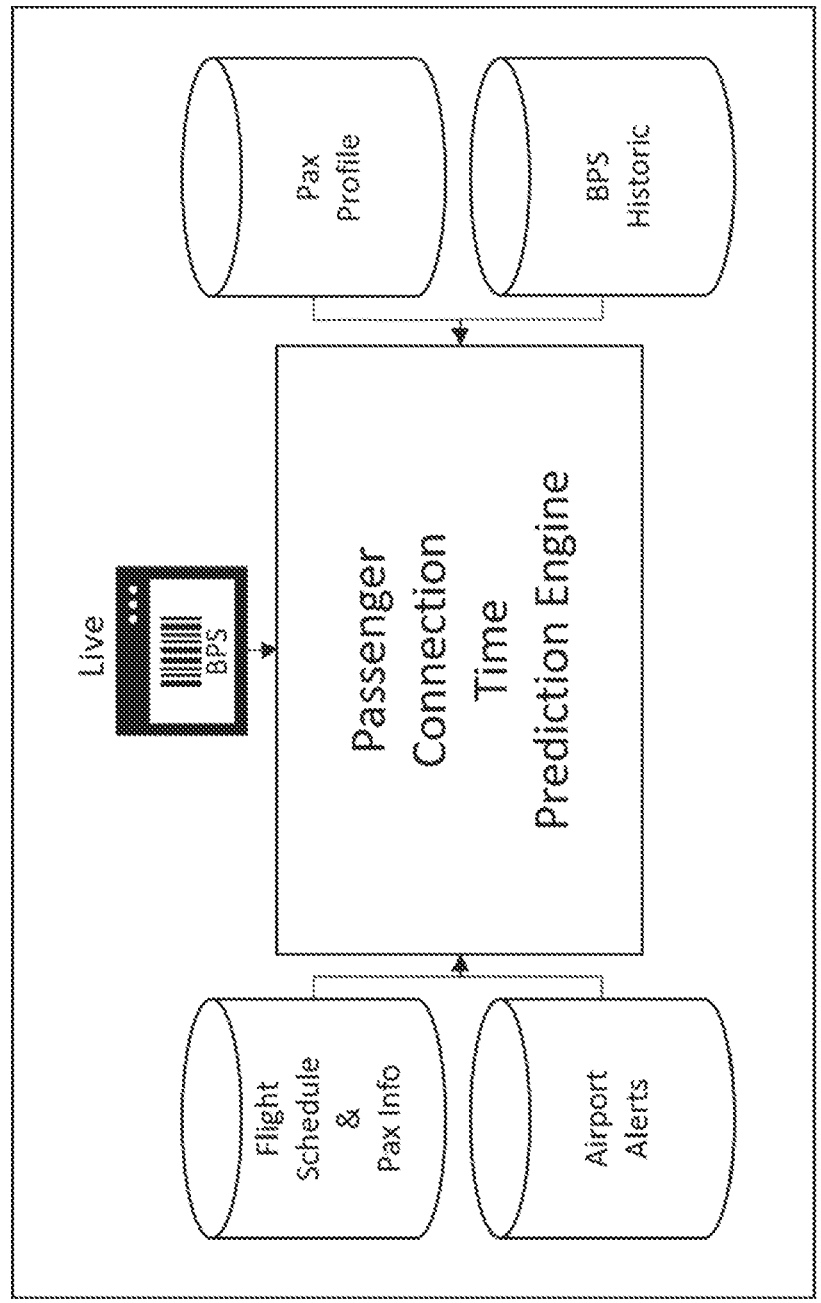
FIG. 10 is a functional block diagram of the system of FIG. 1A for predicting a Gate to Gate (G2G) score corresponding to the gate to gate connection time of the passengers, in accordance with some embodiments of the present disclosure.

Passenger's connection time: FIG. 9 is a schematic representation of factors contributing to variation in gate to gate connection time of passengers and FIG. 10 is a functional block diagram of the system of FIGS. 1A and 1B for predicting a Gate to Gate (G2G) score corresponding to the gate to gate connection time of the passengers, in accordance with some embodiments of the present disclosure. FIG. 9 shows the transition of a passenger from the arrival gate to the outbound departure gate, along with visual representation of few passenger profiles. The difficult part here is to subjectively evaluate the passenger's ability to make the connection. This implicitly indicates that no two passengers can be treated equally and their ability to make the connection may not just depend on the minimum connection time (MCT). To know this, required is to get an idea of a passenger's G2G (Gate to Gate) score. The G2G score is computed based on the data from the Boarding Pass scanning (BPS) block, which gives an idea, historically, of when the passenger had exited his arrival gate and when he reached the departure gate. Now this is a key metric from BPS system, this along with non-PII information about the passenger, flight schedules with gate info and airport alerts are utilized to compute the ability of the passenger to make the connection with the MCT serving as a guideline.

FIG. 10 shows the detailed technical architecture of how the method of the present disclosure uses the BPS system and other relevant system to compute the G2G score.

Flight Schedule and passenger Information (Pax Info): Here this block primarily enables system to know about the possible gate pairs for each departing flight and the list of all connecting passengers. Any last-minute gate changes or passenger cancellations can be obtained from here.

Airport Alerts: Airport alerts are basically used to understand the current state of the airport, any local disruption or potential speed ups can be used to better compute the G2G score.

Pax Profile: This block provides all non-PII passenger information that can be combined with the historical profiled BPS data to tune the passenger specific prediction.

BPS Historic: This block provides the historic BPS data and the passenger profile specific G2G score. These scores are updated every fortnight to keep pace with the changing landscape of the airport.

Passenger Utility is computed as: $P_{utility}=1-P_{disutility}$ (8)

Figure 11:
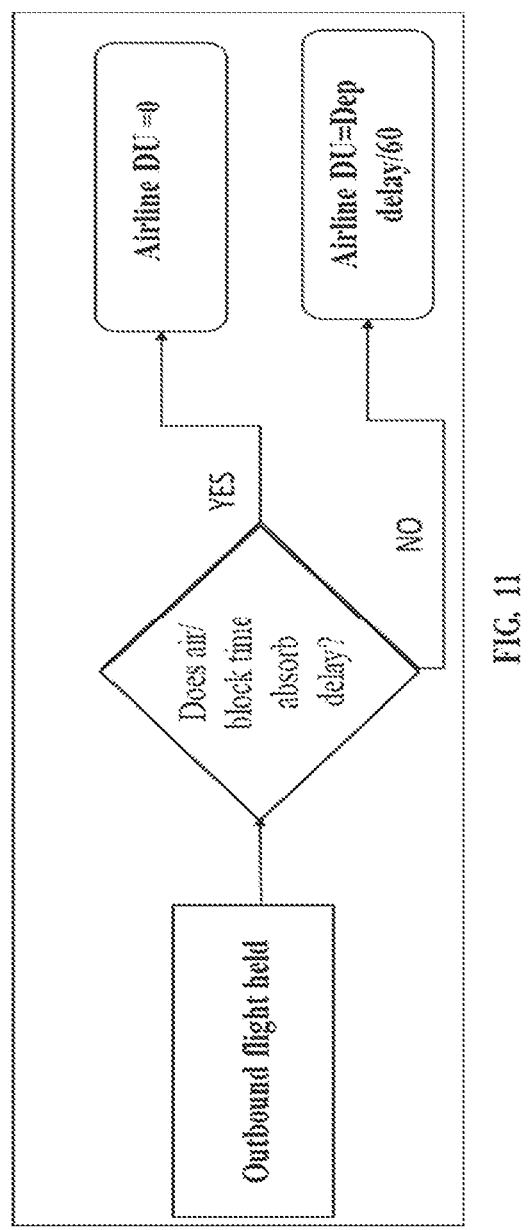
FIG. 11 depicts steps for airline disutility computation used by the method of FIG. 2 to further derive airline utility, in accordance with some embodiments of the present disclosure.

FIG. 11 depicts steps for airline disutility (DU) computation used by the method of FIG. 2 to further derive airline utility, in accordance with some embodiments of the present disclosure. Airline Disutility (DU), as shown in FIG. 11, is simply a function of the departure delay at each hop till the delay dies down.

Airline disutility is computed as:

$$A_{disutility} = \sum_{w=1}^{L} \left(\frac{Tw}{A_{max}}\right), A_{max} = 60 \text{ min} \qquad (9)$$

If rebooking cost, ground cost, crew cost, penalty fees are also available these can also be included. Again, here the system 100 makes use of the historic data from the aircraft's sensor network to estimate the non-hold delays that the flight typically incurs. This ensures that the system 100 avoids redundant holds and make use of the delay patterns. The onboard sensor systems of all incoming aircrafts and incoming tail is used to estimate the arrival and departure times.

Airline Utility is computed as: $A_{utility}=1-A_{disutility}$ (10)

Total Utility: The total utility is a weighted sum of the passenger and airline utility. The ratio applied for combining the two utility can be used as a business lever to operate in the range between efficiency and empathy.

$$T_{utility}=\alpha*P_{utility}+(1-\alpha)*A_{utility} \qquad (11)$$

Total utility in equation 11 above thus represent the local reward and is same as equation 4 above. Considering the dependency of a flight hold time on multitude of dynamically varying factors, determining of an optimal hold time balancing between passenger utility and airline utility is challenging. State of art approaches are limited to use of only deterministic approaches that require huge labelled training data. Thus, the method and system disclosed herein compute optimal hold time for every flight of an airline so as to minimize passenger misconnects in airline operations through Reinforcement Learning (RL). The method disclosed herein utilizes RL, that is trained to make decision at a flight level considering local factors while still adhering to the global objective based on global factors. Further, the method of the present disclosure introduces business constants in the rewards to the RL agents bringing in airline specific flexibility in reward function.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method to determine an optimal hold time for each flight, in real time, to minimize passenger misconnects in airline operations using machine and reinforcement learning, the method comprising:

identifying, by one or more hardware processors, a plurality of Reinforcement Learning (RL) agents implemented by the one or more hardware processors, wherein each of the plurality of RL agents corresponds to a flight among a plurality of flights operated by an airline in a training environment, wherein the training environment is one of a virtual simulated airline network generated for the airline operations and a real world airline operations network, and wherein the plurality of RL agents work in parallel in the training environment on a common simulation timeline, wherein the virtual simulated airline network generates data to represent possible scenarios in the airline operations based on historic data to train the plurality of RL agent, and the real world airline operations network generates data limited to only possible scenarios that have already happened in the airline operations, leading to sub optimal training of the RL agents;

initializing, by the one or more hardware processors, each of the plurality of RL agents with a random seed, and a learning rate ($\varepsilon$) with a gradual decay, wherein the random seed creates initial conditions for learned knowledge representation and the learning rate ($\varepsilon$) controls rate of exploration versus exploitation of each of the plurality of RL agents; and training, by the one or more hardware processors, each of the plurality of RL agents, wherein the training is an iterative process and iterations are terminated when each of the plurality of RL agents consistently reaches an optimal value of a Quality (Q) metric indicating quality of the training, wherein the optimal value of Q is identified by a non-changing convergence among the iterations, and wherein steps in each iteration comprise:

a) setting random values for weights of each of the plurality of RL agents in accordance with the initial random seed;

b) determining, by a Machine Learning (ML) based context engine implemented by the one or more hardware processors, a state of each of the plurality of RL agents defining a current state of the flight corresponding to each of the plurality of RL agents, wherein a plurality of features defining the state of each of the plurality of RL agents comprise:

a local passenger utility vector ($\vec{P}_L$) representing a local utility, experienced by passengers of the flight, for every hold time identified for the flight;

a local airline utility vector ($\vec{A}_L$) representing the local utility, experienced by the airline operating the flight, for every hold time identified for the flight;

an average passenger global utility scalar ($P_G$) representing an average global utility experienced by the passengers of all the flights for a past predefined time window;

an average global airline utility scalar ($A_G$) representing an average global utility experienced by the airline for the past predefined time window; and a hold time guidance value $\tau^*$ indicating a guideline for computing a hold time $\tau$ for the flight, wherein the ML based context engine is pretrained to generate the current state for the flight corresponding to each of the plurality of RL agents using a plurality of flight parameters affecting the hold time $\tau$ of the flight to minimize the passenger misconnects, wherein the pretraining comprises:

applying regression techniques on the plurality of flight parameters comprising passenger (Pax) specific Minimum Connection Time (Pax specific MCT) based on Gate to Gate (G2G) score prediction, crew availability, and tail health obtained from onboard sensory system on the aircraft, with dimensionality reduction technique;

applying clustering techniques for Pax profiling; and applying transformations to:
real world data concerning airline operations and passenger itineraries; and
current location and status of the passenger between bates in an airport derived from passenger history;

c) recommending in real time airline operations, by each of the plurality of RL agents, the hold time $\tau$ for the flight corresponding to each of the plurality of the RL agents, wherein the hold time $\tau$ is computed by processing values of the plurality of features of the current state generated for each of the plurality of RL agents in accordance to the weights of each RL agent and underlying neural schema of a Neural Network (NN) implemented in each of the plurality of RL agents, wherein the NN used herein learns to compute the hold time $\tau$ over time;

d) applying, in the training environment, the hold time $\tau$ estimated by each of the plurality of RL agents to the flight corresponding to each of the plurality of RL agents to run a first round of the airline operations in the training environment for the plurality of flights in accordance to the hold time $\tau$ estimated by each of the plurality of RL agents;

e) regenerating, by the ML based context engine a revised state to be communicated to each of the plurality of RL agents for a successive round of the airline operations for the flight corresponding to each of the plurality of RL agents;

f) receiving a reward ($R_{t-1}$) by each of the plurality of RL agents from a reward engine for the hold time $\tau$ derived from a local reward $R_L$ and a global reward $R_G$ and a business constant $\beta$ precomputed specific to the airline;

g) revising the values of the weights of each of the plurality of RL agents based on the received reward ($R_{t-1}$); and h) recommending, by each of the plurality of RL agents a revised hold time for the flight corresponding to of the plurality of RL agents for the successive round of the airline operations for minimizing the passenger misconnects of one or more flights, wherein the revised hold time is computed by processing the revised values of the plurality of features of the revised state regenerated for each of the plurality of RL agents in accordance with the revised values of the weights of each of the plurality of RL agents.

2. The method of claim 1, where $\tau^*$ is derived from the local passenger utility vector ($\vec{P}_L$), the local airline utility vector ($\vec{A}_L$) and a business constant ($\alpha$) computed specific to the airline, and wherein ($\alpha$) enables adjusting impact of the airline and the local passenger utility vector ($\vec{P}_L$), on the local reward ($R_L$).

3. The method of claim 1, wherein for the reward ($R_{t-1}$) the business constant ($\beta$) enables adjusting balance of the reward towards local or global optima, and wherein
the local reward ($R_L$) comprises an actual local passenger utility ($\hat{P}_L$) component and an actual local airline utility ($\hat{A}_L$) combined using a business constant ($\alpha$); and
the global reward ($R_G$) comprises an average of all the local rewards ($R_{Ls}$) of the plurality of flights operated in last round.

4. The method as claimed in claim 1, wherein learnt knowledge of the plurality of trained RL agents is transferred to a new RL agent associated with a new flight entering the airline as the state defined for any RL agent is portable across the plurality of flights, and wherein training of the new RL agent starts from the learnt knowledge.

5. The method of claim 1, wherein a single RL agent is used for the plurality of flights as the state defined for any RL agent is portable across the plurality of flights.

6. The method of claim 1 further comprising utilizing the trained plurality of RL agents in real time airline operations to determine the hold time $\tau$ of the flight corresponding to each of the plurality of RL agents in real time.

7. A system to determine an optimal hold time for each flight, in real time, to minimize passenger misconnects in airline operations using learning, the system comprising:
a memory storing instructions;
one or more Input/Output (I/O) interfaces; and
one or more hardware processors coupled to the memory via the one or more I/O interfaces, wherein the one or more hardware processors are configured by the instructions to:
identify a plurality of Reinforcement Learning (RL) agents implemented by the one or more hardware processors, wherein each of the plurality of RL agents corresponds to a flight among a plurality of flights operated by an airline in a training environment, wherein the training environment is one of a virtual simulated airline network generated for the airline operations and a real world airline operations network, and wherein the plurality of RL agents work in parallel in the training environment on a common simulation timeline, wherein the virtual simulated airline network generates data to represent possible scenarios in the airline operations based on historic data to train the plurality of RL agent, and the real world airline operations network generates data limited to only possible scenarios that have already happened in the airline operations, leading to sub optimal training of the RL agents;

initialize each of the plurality of RL agents with a random seed, and a learning rate (ε) with a gradual decay, wherein the random seed creates initial conditions for learned knowledge representation and the learning rate (ε) controls rate of exploration versus exploitation of each of the plurality of RL agents; and train each of the plurality of RL agents, wherein the training is an iterative process and iterations are terminated when each of the plurality of RL agents consistently reaches an optimal value of a Quality (Q) metric indicating quality of the training, wherein the optimal value of Q is identified by a non-changing convergence among the iterations, and wherein steps in each iteration comprise:

a) setting random values for weights of each of the plurality of RL agents in accordance with the initial random seed;

b) determining by a Machine Learning (ML) based context engine implemented by the one or more hardware processors, a state of each of the plurality of RL agents defining a current state of the flight corresponding to each of the plurality of RL agents, wherein a plurality of features defining the state of each of the plurality of RL agents comprising:

a local passenger utility vector ($\vec{P}_L$) representing a local utility, experienced by passengers of the flight, for every hold time identified for the flight a local airline utility vector ($\vec{A}_L$) representing the local utility, experienced by the airline operating the flight, for every hold time identified for the flight;

an average passenger global utility scalar ($P_G$) representing an average global utility experienced by the passengers of all the flights for a past predefined time window;

an average global airline utility scalar ($A_G$) representing average global utility experienced by the airline for the past predefined time window; and a hold time guidance value $\tau^*$ indicating a guideline for computing a hold time $\tau$ for the flight, wherein the ML based context engine is pretrained to generate the current state for the flight corresponding to each of the plurality of RL agents using a plurality of flight parameters affecting the hold time $\tau$ of the flight to minimize the passenger misconnects, wherein the pretraining comprises:

applying regression techniques on the plurality of flight parameters comprising passenger (Pax) specific Minimum Connection Time (Pax specific MCT) based on Gate to Gate (G2G) score prediction, crew availability, and tail health obtained from onboard sensory system on the aircraft, with dimensionality reduction technique;

applying clustering techniques for Pax profiling; and applying transformations to:

real world data concerning airline operations and passenger itineraries; and current location and status of the passenger between bates in an airport derived from passenger history;

c) recommending in real time airline operations, by each of the plurality of RL agents, the hold time $\tau$ for the flight corresponding to each of the plurality of RL agents, wherein the hold time $\tau$ is computed by processing values of the plurality of features of the current state generated for each of the plurality of RL agents in accordance to the weights of each RL agent and underlying neural schema of a Neural Network (NN) implemented in each of the plurality of RL agents, wherein the NN used herein learns to compute the hold time $\tau$ over time;

d) applying in the training environment, the hold time $\tau$ estimated by each of the plurality of RL agent to the flight corresponding to each of the plurality of RL agents to run a first round of the airline operations in the training environment for the plurality of flights in accordance to the hold time $\tau$ estimated by each of the plurality of RL agents;

e) regenerating by the ML based context engine a revised state to be communicated to each of the plurality of RL agents for a successive round of the airline operations for the flight corresponding to each of the plurality of RL agents;

f) receiving a reward ($R_{t-1}$) by each of the plurality of RL agents from a reward engine for the hold time $\tau$ derived from a local reward $R_L$ and a global reward $R_G$ and a business constant $\beta$ precomputed specific to the airline;

g) revising the values of the weights of each of the plurality of RL agents based on the received reward ($R_{t-1}$); and h) recommending by each of the plurality of RL agents a revised hold time for the flight corresponding to each of the plurality of RL agents for the successive round of the airline operations for minimizing the passenger misconnects of one or more flights, wherein the revised hold time is computed by processing the revised values of the plurality of features of the revised state regenerated for each of the plurality of RL agents in accordance with the revised values of the weights of each of the plurality of RL agents.

8. The system of claim 7, wherein $\tau^*$ is derived from the local passenger utility vector ($\vec{P}_L$), the local airline utility vector ($\vec{A}_L$) and a business constant ($\alpha$) computed specific to the airline, wherein ($\alpha$) enables adjusting impact of the airline and the local passenger utility vector ($\vec{P}_L$), on the local reward.

9. The system of claim 7, wherein for the reward ($R_{t-1}$), the business constant ($\beta$) enables adjusting balance of the reward towards local or global optima, and wherein the local reward ($R_L$) comprises an actual local passenger utility ($\hat{P}_L$) component and an actual local airline utility ($\hat{A}_L$) combined using a business constant ($\alpha$); and the global reward ($R_G$) comprises an average of all the local rewards ($R_{Ls}$) of the plurality of flights operated in last round.

10. The system of claim 7, wherein learnt knowledge of the plurality of trained RL agents is transferred to a new RL agent associated with a new flight entering the airline as the state defined for any RL agent is portable across the plurality of flights, and wherein training of the new RL agent starts from the pre-acquired learnt knowledge.

11. The system of claim 7, wherein a single RL agent is used for the plurality of flights as the state defined for any RL agent is portable across the plurality of flights.

12. The system of claim 7 further comprising utilizing the trained plurality of RL agents in real time airline operations to determine the hold time τ of the flight, corresponding to each of the plurality of RL agents, in real time.

13. One or more non-transitory machine-readable information storage mediums comprising one or more instructions, which when executed by one or more hardware processors causes:
identifying a plurality of Reinforcement Learning (RL) agents implemented by the one or more hardware processors, wherein each of the plurality of RL agents corresponds to a flight among a plurality of flights operated by an airline in a training environment, wherein the training environment is one of a virtual simulated airline network generated for the airline operations and a real world airline operations network, and wherein the plurality of RL agents work in parallel in the training environment on a common simulation timeline, wherein the virtual simulated airline network generates data to represent possible scenarios in the airline operations based on historic data to train the plurality of RL agent, and the real world airline operations network generates data limited to only possible scenarios that have already happened in the airline operations, leading to sub optimal training of the RL agents;
initializing each of the plurality of RL agents with a random seed, and a learning rate (ε) with a gradual decay, wherein the random seed creates initial conditions for learned knowledge representation and the learning rate (ε) controls rate of exploration versus exploitation of each of the plurality of RL agents; and
training each of the plurality of RL agents, wherein the training is an iterative process and iterations are terminated when each of the plurality of RL agents consistently reaches an optimal value of a Quality (Q) metric indicating quality of the training, wherein the optimal value of Q is identified by a non-changing convergence among the iterations, and wherein steps in each iteration comprise:
a) setting random values for weights of each of the plurality of RL agents in accordance with the initial random seed;
b) determining by a Machine Learning (ML) based context engine implemented by the one or more hardware processors, a state of each of the plurality of RL agents defining a current state of the flight corresponding to each of the plurality of RL agents, wherein a plurality of features defining the state of each of the plurality of RL agents comprise:
a local passenger utility vector ($\vec{P}_L$) representing a local utility, experienced by passengers of the flight, for every hold time identified for the flight;
a local airline utility vector ($\vec{A}_L$) representing the local utility, experienced by the airline operating the flight, for every hold time identified for the flight;
an average passenger global utility scalar ($P_G$) representing an average global utility experienced by the passengers of all the flights for a past predefined time window;
an average global airline utility scalar ($A_G$) representing an average global utility experienced by the airline for the past predefined time window; and
a hold time guidance value τ* indicating a guideline for computing a hold time τ for the flight,
wherein the ML based context engine is pretrained to generate the current state for the flight corresponding to each of the plurality of RL agents using a plurality of flight parameters affecting the hold time τ of the flight to minimize the passenger misconnects, wherein the pretraining comprises:
applying regression techniques on the plurality of flight parameters comprising passenger (Pax) specific Minimum Connection Time (Pax specific MCT) based on Gate to Gate (G2G) score prediction, crew availability, and tail health obtained from onboard sensory system on the aircraft, with dimensionality reduction technique;
applying clustering techniques for Pax profiling; and
applying transformations to:
real world data concerning airline operations and passenger itineraries; and
current location and status of the passenger between bates in an airport derived from passenger history;
c) recommending in real time airline operations by each of the plurality of RL agents, the hold time τ for the flight corresponding to each of the plurality of the RL agents, wherein the hold time τ is computed by processing values of the plurality of features of the current state generated for each of the plurality of RL agents in accordance to the weights of each RL agent and underlying neural schema a Neural Network (NN) implemented in of each of the plurality of RL agents, wherein the NN used herein learns to compute the hold time τ over time;
d) applying in the training environment, the hold time τ estimated by each of the plurality of RL agents to the flight corresponding to each of the plurality of RL agents to run a first round of the airline operations in the training environment for the plurality of flights in accordance to the hold time τ estimated by each of the plurality of RL agents;
e) regenerating, by the ML based context engine a revised state to be communicated to each of the plurality of RL agents for a successive round of the airline operations for the flight corresponding to each of the plurality of RL agents;
f) receiving a reward ($R_{t-1}$) by each of the plurality of RL agents from a reward engine for the hold time τ derived from a local reward $R_L$ and a global reward $R_G$ and a business constant β precomputed specific to the airline;
g) revising the values of the weights of each of the plurality of RL agents based on the received reward ($R_{t-1}$); and
h) recommending by each of the plurality of RL agents a revised hold time for the flight corresponding to of the plurality of RL agents for the successive round of the airline operations for minimizing the passenger misconnects of one or more flights, wherein the revised hold time is computed by processing the revised values of the plurality of features of the revised state regenerated for each of the plurality of RL agents in accordance with the revised values of the weights of each of the plurality of RL agents.

* * * * *